Sept. 1, 1942.  W. V. MANSKE  2,294,758
FISHHOOK EXTRACTOR
Filed Sept. 5, 1941
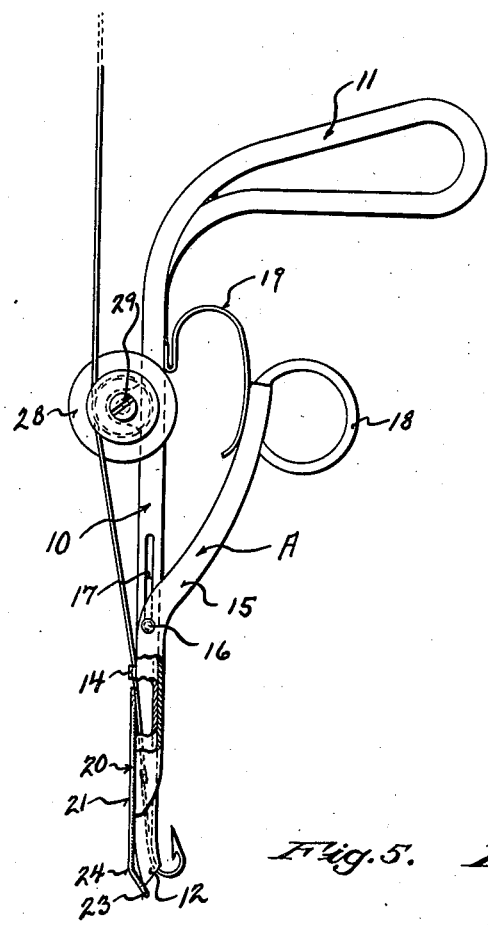
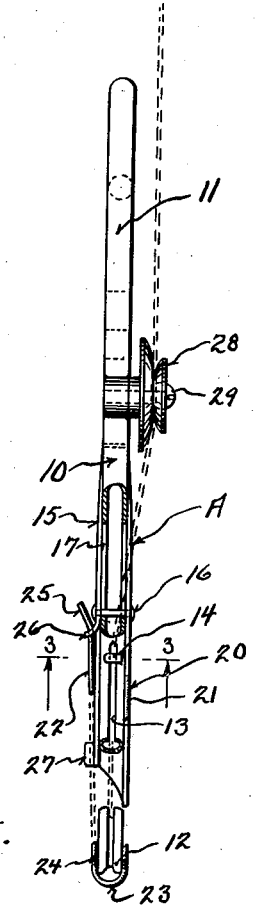
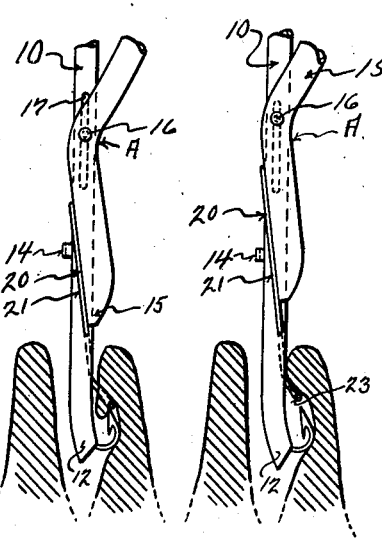
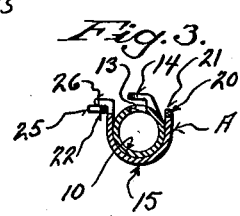
INVENTOR
WALTER V. MANSKE
BY
ATTORNEYS Patented Sept. 1, 1942

2,294,758

UNITED STATES PATENT OFFICE 2,294,758

FISHHOOK EXTRACTOR

Walter V. Manske, Milwaukee, Wis., assignor of one-third to Roman H. Manske, Milwaukee, Wis.

Application September 5, 1941, Serial No. 409,603

5 Claims. (Cl. 43—29)

This invention appertains to fishing and more particularly to a novel appliance for releasing and extracting hooks from fish.

Certain species of fish are awkward or dangerous to handle and some fish tend to swallow the entire hook. With these fish, the removal of a hook therefrom is quite a problem. Some fishermen, in preference to handling this fish, cut their line above the hook. Where fish are caught under legal size, the law requires that the fish be handled in a certain way and returned to their waters without injury. The grasping of a fish to remove a hook therefrom generally injures the fish.

It is therefore one of the primary objects of my invention to provide a hand tool, which can be readily and quickly manipulated for effectively removing hooks from fish without the necessity of handling the fish or injuring the fish in any way.

Another salient object of my invention is to provide a hand tool for releasing and extracting hooks from fish which can be manipulated with one hand and which does not have to be inserted in the fish any further than the fish hook, whereby a minimum amount of injury will be sustained by the fish.

A further important object of my invention is the provision of a fish hook extractor embodying a shank having a gripping handle formed on one end and a fish hook engaging member at its opposite end with a sliding and pivot actuating lever on the shank carrying a loop for stripping the hook from the fish and for acting as a guard for the barb of the hook during the removal of the hook and shank from the fish.

A still further object of my invention is the provision of a novel means for facilitating a quick association of the hook and its leader or line with the shank and for holding the hook against accidental displacement during the manipulation of the device.

A still further important object of my invention is to provide a fish hook extractor which will be durable and efficient in use, one that will be simple and easy to manufacture and one which can be placed upon the market at a reasonable cost.

With this and other objects in view the invention consists in the novel construction, arrangement and formation of parts, as will be hereinafter more specifically described, claimed and illustrated in the accompanying drawing, in which drawing:

Figure 1 is a front elevational view of my novel fish hook extractor illustrating the position of the hook therein, parts of the view being shown broken away and in section to illustrate structural detail.

Figure 2 is a side elevational view of my device with parts thereof broken away and in section.

Figure 3 is a transverse sectional view through my appliance taken on the line 3—3 of Figure 2, looking in the direction of the arrows.

Figure 4 is a fragmentary detail elevational view showing the lower end of my appliance and illustrating the position thereof in the mouth of a caught fish preparatory to removing the hook therefrom.

Figure 5 is a view similar to Figure 4 and showing the appliance after manipulation for releasing the hook from the fish.

Figure 6 is a view similar to Figure 5 and showing the position of the parts of the appliance just prior to the removal of the appliance and hook from the fish.

Referring to the drawing in detail, wherein similar reference characters designate corresponding parts throughout the several views, the letter A generally indicates my novel appliance and the same includes an elongated longitudinally extending shank 10. This shank 10 can be formed from any desired material such as a length of tubing. Where the shank is formed from tubing the outer end thereof can be bent to form a handle 11, which can simulate a pistol grip. The extreme forward end of the shank is slightly arcuated or curved laterally as at 12. One side of the shank is provided with a longitudinally extending slot 13 which extends to the extreme forward end of the shank. The slot 13 terminates at a point short of the transverse center of the shank and the shank has connected therewith adjacent to the inner end of the slot a laterally extending finger 14 which acts as a line or leader guide as will be later set forth. The forward slotted end of the shank acts as a seat for the hook as will also be more fully described.

Mounted on the side of the shank opposite to the slot 13 is a manipulating lever 15. The lever 15 is substantially of a bell crank shape and carries at its angle a fulcrum pin 16. The forward end of the lever is of a substantial U shape in cross section for snugly fitting over the tubular shank 10 and the shank in rear of the guide slot 13 is provided with a cross slot 17 which slidably and pivotally receives the pin 16.

Thus the lever 15 is pivotally and slidably mounted upon the shank. The rear end of the lever normally angles away from the shank 10 and terminates in a finger grip or ring 18.

Rigidly secured to the shank 10 is a leaf spring 19 and the free end of the spring engages the lever 15 and normally urges the forward end of the lever into contact with the shank 10. During manipulation of the lever the same slides longitudinal of the spring 19.

The forward end of the lever terminates short of the forward end of the shank and the lever carries a forwardly projecting extracting member 20. This member 20 is preferably formed from wire of the desired gage and stiffness and is of a substantial U shape in plan and includes space parallel legs 21 and 22 and a front connected loop or bight portion 23. The extreme front of the member 20 is bent so as to provide an angularly extending portion 24 which projects toward the front end of the shank. The leg 21 of the member is rigidly secured to one side of the lever 15 and the other leg 22 of the member extends longitudinally along the other side of the lever. The rear end of this leg is angled laterally as at 25 away from the lever to form a line guide as will be apparent as the description proceeds. This end of the leg is retained in its operative position by means of a tongue 26 struck out from the lever 15. A guide lug 27 can also be formed on the lever adjacent to the front end thereof for holding the leg 22 of the member 20 in proper position.

Carried by one side of the shank 10 forwardly of the handle 11 is a pair of friction discs 28 between which the hook leader or line can be fastened. These friction discs can be carried by a stud 29 which is connected with the shank 10. Normally the parts are disposed as shown in Figure 1, and my appliance is gripped in one hand by the hand grip 11 with the forefinger placed in the finger grip or ring 18. The leader or the fish line is grasped in the other hand and the line is placed between the leg 22 and the lever 15 and the shank 10. This operation is facilitated by the angle portion 25 of the leg which acts as a guide. The line is now brought forwardly until the same engages the bight portion 23 of the manipulating member 20 at which time the line or leader is placed in the slot 13 and the hook and line is pulled up tight until the curved portion of the hook seats in the front end of the shank which forms a seat for the hook. As the hook is pulled tight in place, the line or leader is threaded under the finger 14 and is placed between the friction discs, which securely holds the line, hook and fish in place. During this manipulation, the forward end of the shank is brought into the fish at the point of the engagement of the hook with the fish, as is clearly shown in Figure 4. Pressure is now exerted on the inner end of the lever 15 which rocks the lever and brings the bight portion 23 of the manipulating member 20 over the front end of the shank 10. The lever is now pulled rearwardly, see Figure 5, and the bight portion 23 will effectively carry and strip the flesh of the fish from off the hook and the hook and the appliance can be removed from the fish. As the portion 23 of the manipulating member 20 lies in front of the barb of the hook during the removal of the appliance from the fish, the hook will be prevented from again catching in the fish.

The hook can be quickly removed from the appliance by simply unwinding same from between the friction discs 28 which will permit the hook to drop from off the front end of the shank. The lever 15 can now be manipulated so as to return the same to its normal position and the device is again ready for use.

With the use of my appliance it will be found that in most instances the bait on the hook will not be disturbed during the removal of the hook from the fish.

As the fish does not have to be handled the same will not be injured and conversely, as the fisherman does not have to touch the fish injury to the fisherman is prevented.

Obviously the appliance can be made in different sizes and shapes to suit varying conditions and sizes and types of fish being handled. Various changes in details may be made without departing from the spirit or scope of my invention, but what I claim as new is:

1. A fish hook extractor comprising a shank, a hand grip carried by the rear end of the shank, a manipulating lever slidably and pivotally mounted upon the shank, a finger grip on the rear end of the lever, the forward end of the shank having a seat for a fish hook thereon and a releasing member carried by the forward end of the lever movable over the front end of the shank upon swinging movement of the lever.

2. A fish hook extractor comprising a shank having a slot therein extending out through the front end thereof and a seat at said front end for a fish hook, said slot being adapted to receive the fish hook leader, a lever slidably and rockably mounted upon the shank, and a member carried by the forward end of the lever movable back and forth over the front end of the shank and slidable longitudinally of the shank when the same is in one position relative to the front end of the shank.

3. A fish hook extractor comprising a shank having a slot therein extending out through the front end thereof and a seat at said front end for a fish hook, said slot being adapted to receive the fish hook leader, a lever slidably and rockably mounted upon the shank, and a member carried by the forward end of the lever movable back and forth over the front end of the shank and slidable longitudinally of the shank when the same is in one position relative to the front end of the shank, said member being of a U shape in elevation for normally straddling the lever and shank.

4. A fish hook extractor comprising an elongated shank, a hand grip carried by the rear end of the shank, the front end of the shank having a seat for receiving a fish hook and said shank having a longitudinal slot extending from said seat to receive the leader of the hook, means on said shank for holding the leader taut, a U shape manipulating member including space parallel legs for straddling the lever and a connecting bight portion normally extending in front of the shank for swinging movement over said shank, means securing one leg to the shank, said other leg being free of the shank for permitting the thread of a fish hook leader in said manipulating member and into the slot, spring means normally holding the lever in a pre-determined position, and a finger grip on said lever for facilitating the manipulation thereof.

5. A fish hook extractor comprising an elongated shank, a hand grip carried by the rear end of the shank, the front end of the shank being angled and having a seat for a fish hook and said shank also having a longitudinal slot extending from said seat for receiving the leader of the fish hook, an operating lever of a bell crank shape slidably and rockably mounted at its angle on said shank intermediate the ends of the shank, a fish hook stripping member of a U shape in plan including space parallel legs for lying on opposite sides of the lever and shank and a front angled connecting bight portion overlying the front end of said shank, means securing one of said legs to the lever, the other of said legs being free of the lever, spring means engaging the lever normally holding the lever in a pre-determined position, a finger grip on the rear end of said lever, and means on the shank for holding a fish line.

WALTER V. MANSKE.